United States Patent
Izumi

(10) Patent No.: US 9,866,344 B2
(45) Date of Patent: Jan. 9, 2018

(54) FREQUENCY CONVERSION DEVICE, WAVELENGTH MULTIPLEX DEVICE AND FREQUENCY CONVERSION METHOD

(71) Applicant: FUJITSU LIMITED, Kawasaki-shi, Kanagawa (JP)

(72) Inventor: Futoshi Izumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 14/796,047

(22) Filed: Jul. 10, 2015

(65) Prior Publication Data

US 2015/0318947 A1    Nov. 5, 2015

Related U.S. Application Data

(63) Continuation of application No. PCT/JP2013/051073, filed on Jan. 21, 2013.

(51) Int. Cl.
| | |
|---|---|
| *H04J 14/02* | (2006.01) |
| *H04Q 11/00* | (2006.01) |
| *G02F 1/35* | (2006.01) |
| *H04B 10/04* | (2006.01) |
| *H04B 10/06* | (2006.01) |
| *H04B 10/291* | (2013.01) |

(52) U.S. Cl.
CPC ........... *H04J 14/02* (2013.01); *G02F 1/353* (2013.01); *H04B 10/291* (2013.01); *H04Q 11/0005* (2013.01); *G02F 2203/585* (2013.01); *H04Q 2011/0011* (2013.01); *H04Q 2011/0016* (2013.01)

(58) Field of Classification Search
USPC .............................................. 398/48, 45, 43
See application file for complete search history.

(56) References Cited

U.S. PATENT DOCUMENTS

| 5,005,166 A | * | 4/1991 | Suzuki | ..................... H04J 14/00 398/47 |
|---|---|---|---|---|
| 5,194,977 A | * | 3/1993 | Nishio | ............... H04Q 11/0001 398/48 |
| 5,457,559 A | * | 10/1995 | Saito | ..................... H04L 7/0075 398/155 |

(Continued)

FOREIGN PATENT DOCUMENTS

| JP | 10-078595 | 3/1998 |
|---|---|---|
| JP | 2000-171841 | 6/2000 |

(Continued)

OTHER PUBLICATIONS

International Search Report and Written Opinion of the International Searching Authority (Form PCT/ISA/210, Form PCT/ISA/237), mailed in connection with PCT/JP2013/051073 and dated Apr. 23, 2013 (7 pages). Partial English translation.

(Continued)

*Primary Examiner* — Oommen Jacob

(74) *Attorney, Agent, or Firm* — Fujitsu Patent Center

(57) ABSTRACT

A frequency conversion device includes: an optical convertor configured to convert a source modulated light into an unmodulated light; and a frequency convertor configured to use the unmodulated light converted by the optical convertor as a reference light and convert the source modulated light into a modulated light that has a desirable frequency.

15 Claims, 14 Drawing Sheets

(56) References Cited

U.S. PATENT DOCUMENTS

| | | | |
|---|---|---|---|
| 5,781,335 A * | 7/1998 | Derr | H04B 10/66 359/326 |
| 5,959,764 A | 9/1999 | Edagawa et al. | |
| 6,026,204 A * | 2/2000 | Chbat | H04B 10/25253 385/24 |
| 6,282,015 B1 * | 8/2001 | Ueno | G02F 2/004 359/332 |
| 6,317,529 B1 * | 11/2001 | Kashima | H04Q 11/0005 385/16 |
| 6,437,905 B1 * | 8/2002 | Joyner | G02F 2/004 359/326 |
| 6,512,619 B1 * | 1/2003 | Fuse | H04B 10/548 359/237 |
| 7,099,586 B2 * | 8/2006 | Yoo | H04B 10/299 398/173 |
| 7,209,666 B2 * | 4/2007 | Chiaroni | H04L 7/0075 398/155 |
| 7,342,713 B2 * | 3/2008 | Chaput | H01S 5/50 359/332 |
| 7,532,821 B2 * | 5/2009 | Lee | H04L 7/0075 398/155 |
| 2001/0021046 A1 * | 9/2001 | Otani | H04J 14/0223 398/43 |
| 2001/0038481 A1 * | 11/2001 | Li | H04L 7/0075 398/155 |
| 2002/0135865 A1 * | 9/2002 | Tilleman | G02F 2/004 359/326 |
| 2003/0154497 A1 * | 8/2003 | Masuda | H04B 10/272 725/129 |
| 2004/0008403 A1 * | 1/2004 | Kondoh | G02F 2/02 359/326 |
| 2004/0090662 A1 * | 5/2004 | Bang | G02F 2/004 359/326 |
| 2004/0170438 A1 * | 9/2004 | Kuribayashi | H04B 10/299 398/175 |
| 2005/0111499 A1 | 5/2005 | Tanaka | |
| 2007/0014579 A1 * | 1/2007 | Buchali | H04B 10/5165 398/183 |
| 2007/0230970 A1 * | 10/2007 | Asano | H04B 10/504 398/187 |
| 2008/0231850 A1 * | 9/2008 | Yamashita | G01N 21/3581 356/300 |
| 2010/0142569 A1 * | 6/2010 | Magel | H01S 3/109 372/21 |
| 2011/0075688 A1 * | 3/2011 | Chiang | G02F 1/292 372/12 |
| 2012/0194901 A1 * | 8/2012 | Bravo-Abad | H01Q 1/38 359/330 |
| 2013/0071113 A1 * | 3/2013 | McKinstrie | H04B 10/291 398/39 |
| 2014/0161452 A1 * | 6/2014 | Okabe | H04J 14/06 398/65 |
| 2014/0211211 A1 * | 7/2014 | Qiu | G01C 19/723 356/461 |
| 2015/0318947 A1 * | 11/2015 | Izumi | G02F 1/353 398/48 |

FOREIGN PATENT DOCUMENTS

| | | |
|---|---|---|
| JP | 2000-278218 | 10/2000 |
| JP | 2002-006355 | 1/2002 |
| JP | 2005-173572 | 6/2005 |
| JP | 2012-118465 | 6/2012 |

OTHER PUBLICATIONS

H. Taniguchi et al., "Development of Wavelength Converter Based on Quasi-Phase-Matched PPMgLN Waveguide," Mitsubishi Cable Industries review, No. 99, pp. 29-34 (6 pages), Jul. 2002.
Nonlinear Optical Crystals, "Nonlinear Optical Crystals," <http://www.hi-ho.ne.jp/dhow/new_page_2.htm> (8 pages), May 1, 2005.
S. Kurimura et al., "2. Ceramics light source element materials by Nano structure control (3) Wide wavelength area wavelength conversion element materials," Materials Science Outlook, pp. 222-226 (7 pages), Nov. 2006, partial English translation.
JPOA—Office Action of Japanese Patent Application No. 2014-557300 dated Aug. 9, 2016, with full English translation of the Office Action.

* cited by examiner ns*US 9,866,344 B2*

FREQUENCY CONVERSION DEVICE, WAVELENGTH MULTIPLEX DEVICE AND FREQUENCY CONVERSION METHOD

CROSS-REFERENCE TO RELATED APPLICATION

This application is a continuation application of International Application PCT/JP2013/051073 filed on Jan. 21, 2013 and designated the U.S., the entire contents of which are incorporated herein by reference.

FIELD

A certain aspect of embodiments described herein relates to a frequency conversion device, a wavelength multiplex device and a frequency conversion method.

BACKGROUND

There are demands for a colorless function of ROADM (Reconfigurable Optical Add/Drop Multiplexer). The colorless function has a merit of transmitting an arbitrary wavelength signal to a network. In order to achieve the colorless function, it is preferable that a frequency (wavelength) can be converted. For example, it is possible to convert a modulated light into a modulated light having a difference frequency by inputting a modulated light $\omega 1$ and an unmodulated light $\omega 2$ into a non-linear crystal and generating a difference frequency ($\omega 2 - \omega 1$) (for example, see Japanese Patent Application Publications No. 2005-173572 and No. 2000-171841 hereinafter referred to as Documents 1 and 2).

SUMMARY

According to an aspect of the present invention, there is provided a frequency conversion device including: an optical convertor configured to convert a source modulated light into an unmodulated light; and a frequency convertor configured to use the unmodulated light converted by the optical convertor as a reference light and convert the source modulated light into a modulated light that has a desirable frequency.

According to another aspect of the present invention, there is provided a wavelength multiplex device including: a multiplexer that multiplexes a plurality of wavelength lights; a plurality of frequency conversion devices that are respectively coupled with each inputting port of the multiplexer, the plurality of frequency conversion devices comprising an optical convertor configured to convert a source modulated light into an unmodulated light and a frequency convertor configured to use the unmodulated light converted by the optical convertor as a reference light and convert the source modulated light into a modulated light that has a desirable frequency; and an optical switch that inputs an arbitrary wavelength light into one of the plurality of frequency conversion devices.

According to another aspect of the present invention, there is provided a frequency conversion method including: converting a source modulated light into an unmodulated light, with an optical convertor; and using the unmodulated light as a reference light and converting the source modulated light into a modulated light having a desirable frequency, with a frequency convertor.

DESCRIPTION OF EMBODIMENTS

In Documents 1 and 2, when a frequency of a modulated light is converted into a desirable frequency, it is possible to determine a frequency $\omega 2$ of an unmodulated light by obtaining information of a frequency $\omega 1$ of a modulated light. That is, it is necessary to monitor the frequency of the modulated light in order to determine a wavelength of the unmodulated light input into a non-linear crystal.

Figure 1A:
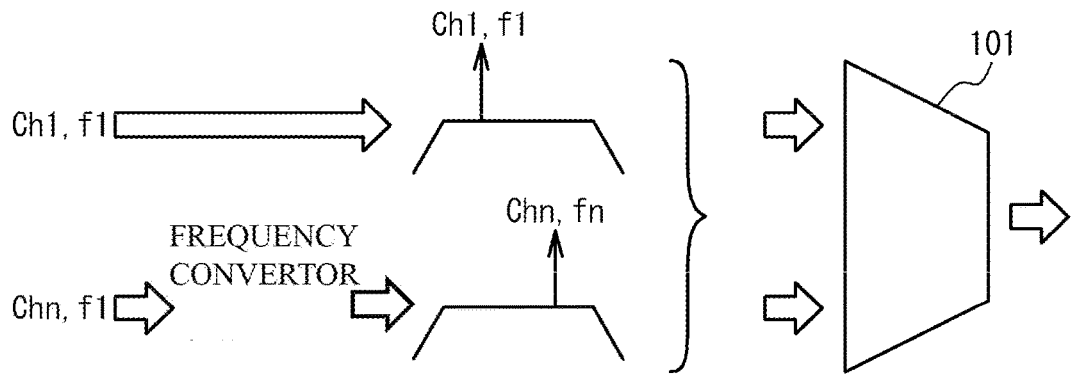
FIG. 1A illustrates a case where signal lights are multiplexed.

A description will be given of the colorless function before describing embodiments. FIG. 1A illustrates a case where a wavelength multiplexer 101 multiplexes a signal light of a channel Ch1 (a modulated light of a frequency f1) and a signal light of a channel Chn (a modulated light of a frequency f1). As illustrated in FIG. 1A, the both signal lights have an identical frequency f1. Therefore, a frequency (wavelength) of the modulated light of the channel Chn is converted into a frequency fn ($\neq$ f1). In this case, even if the source frequencies of the both modulated lights are an identical, wavelength multiplexing is possible.

Figure 1B:
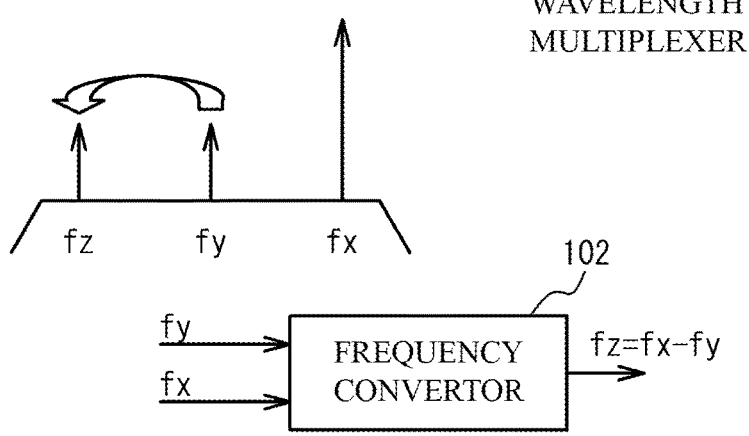
FIG. 1B illustrates a frequency convertor.

FIG. 1B illustrates a frequency convertor 102. For example, a non-linear crystal can be used as the frequency convertor 102. As illustrated in FIG. 1B, the frequency convertor 102 receives an idle signal (an unmodulated light) having a frequency fx and a signal light (modulated light) having a frequency fy. For example, the frequency convertor 102 is a non-linear crystal that output a difference frequency component and outputs an optical signal (a modulated light) having a frequency fz (=fx−fy). That is, the modulated light having the frequency fy is converted into the modulated light having the frequency fz.

Figure 1C:
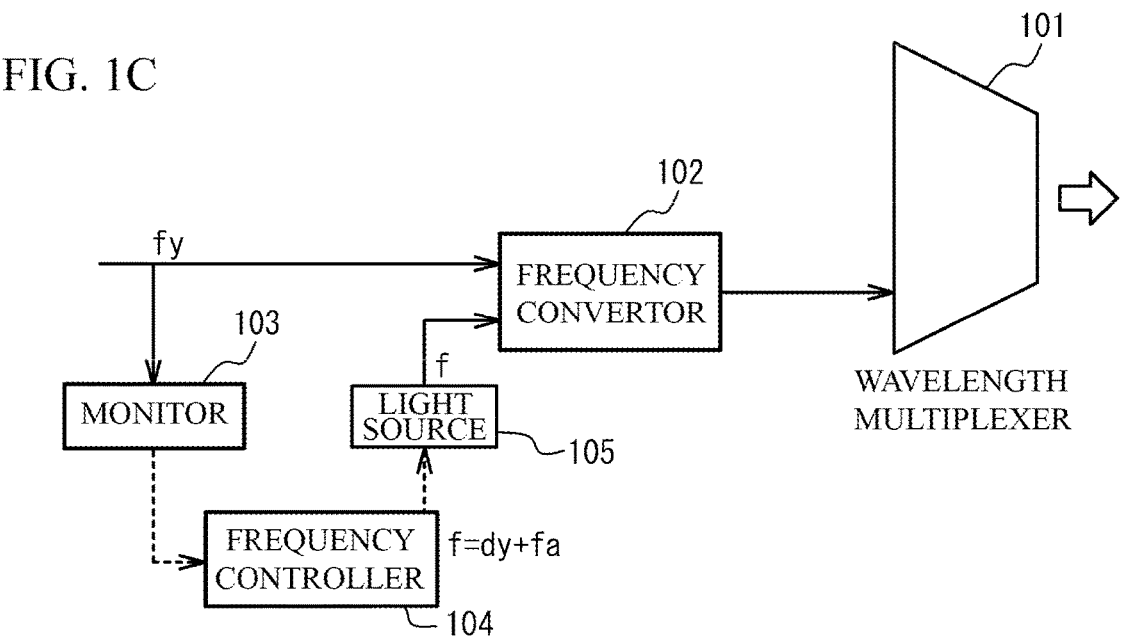
FIG. 1C illustrates a controlling of a frequency.

It is assumed that the frequency fx of the above-mentioned unmodulated light is controlled to a desirable value and the frequency fy is indefinite. In this case, the frequency fz of the modulated light output from the frequency convertor 102 depends on the frequency fy. And so, it is necessary to control the frequency fy to a desirable value by detecting the frequency fy and adjusting the frequency fx. FIG. 1C illustrates the controlling of the frequency fy. As illustrated in FIG. 1C, a monitor 103 detects the frequency fy. A frequency controller 104 electrically controls a light source 105 for unmodulated lights such that the frequency fz becomes a desirable value in accordance with the detected frequency. In this manner, it is necessary to monitor a frequency for a modulated light in order to electrically control a wavelength of an unmodulated light that is input into the frequency convertor 102.

And so, a description will be given of a frequency conversion device and a frequency conversion method that are capable of converting a frequency into a desirable frequency without monitoring the frequency, in the following embodiments.

First Embodiment

Figure 2:
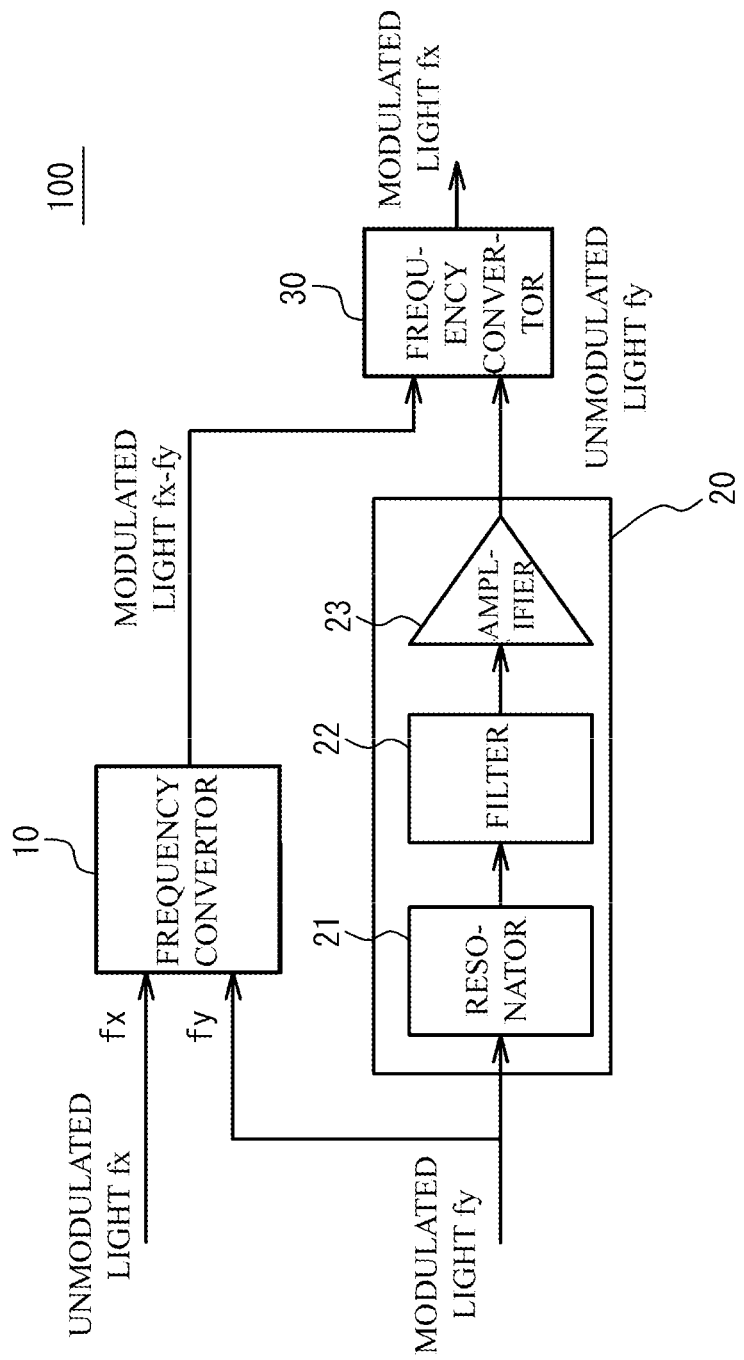
FIG. 2 illustrates a block diagram of a frequency conversion device in accordance with a first embodiment.

FIG. 2 illustrates a block diagram of a frequency conversion device 100 in accordance with a first embodiment. As illustrated in FIG. 2, the frequency conversion device 100 has a frequency convertor 10, a center frequency extractor 20, and a frequency convertor 30. The center frequency extractor 20 has a resonator 21, a filter 22 and an amplifier 23.

The frequency convertor 10 is a non-linear crystal for generating a difference frequency component. The frequency convertor 10 receives a modulated light fy having a frequency fy and an unmodulated light fx having a frequency fx. The frequency fy is an arbitrary frequency. The frequency fx is a desirable frequency which the frequency conversion device 100 outputs. The frequency convertor 10 generates a difference frequency component between the unmodulated light fx and the modulated light fy. In concrete, the frequency convertor 10 outputs a modulated light (fx−fy) having a frequency (fx−fy). A wave form of the modulated light (fx−fy) is the same as that of the modulated light fy.

The center frequency extractor 20 converts the modulated light fy into an unmodulated light having the frequency fy by extracting a center frequency of the modulated light fy. In concrete, the resonator 21 averages the modulated light fy by resonating the modulated light fy. Next, the filter 22 outputs the unmodulated light fy having the frequency fy by extracting the center frequency fy from the resonated modulated light fy. The filter 22 is a band pass filter, and is, for example, a comb type of a narrow band pass filter. The amplifier 23 amplifies the intensity of the unmodulated light fy to a desirable value. With the processes, the center frequency extractor 20 converts the modulated light fy into the unmodulated light fy. The unmodulated light fy is used as a reference light.

The frequency convertor 30 is a non-linear crystal for generating a sum frequency component. The frequency convertor 30 receives the modulated light (fx−fy) and the unmodulated light fy acting as the reference light. The frequency convertor 30 generates a sum frequency component of the modulated light (fx−fy) and the unmodulated light fy. In concrete, the frequency convertor 30 outputs a modulated light fx having the frequency fx. A wave form of the modulated light fx is the same as that of the modulated light fy.

Figure 3A:
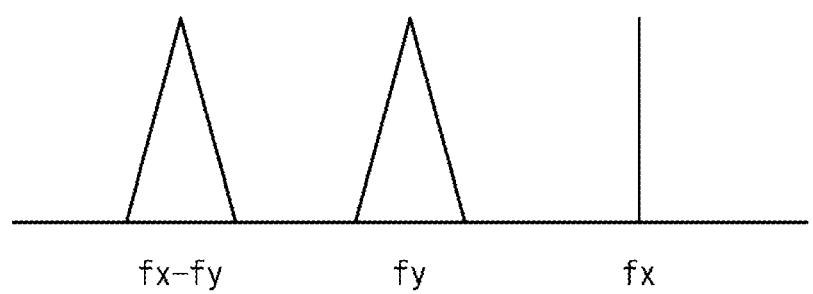
FIG. 3A and FIG. 3B illustrate processes in which a modulated light fx is generated from a modulated light fy and an unmodulated light fx.
Figure 3B:
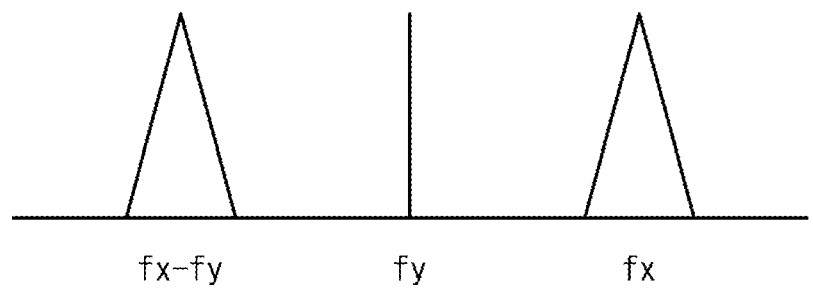

FIG. 3A and FIG. 3B illustrate the processes in which the modulated light fx is generated from the modulated light fy and the unmodulated light fx. As illustrated in FIG. 3A, the frequency convertor 10 generates the modulated light (fx−fy) from the modulated light fy and the unmodulated light fx. Next, as illustrated in FIG. 3B, the frequency convertor 30 generates the modulated light fx from the modulated light (fx−fy) and the unmodulated light fy.

In the embodiment, it is possible to convert the modulated light fy acting as a source modulated light into the unmodulated light fy and convert the modulated light fy into the modulated light fx having a desirable frequency with use of the unmodulated light fy as the reference light. It is therefore possible to convert the modulated light fy having an arbitrary frequency fy into the modulated light fx having a desirable frequency fx without monitoring a frequency. In the embodiment, the center frequency extractor 20 acts as an optical convertor configured to convert a source modulated light in to a reference light. The frequency convertor 10 and the frequency convertor 30 act as a frequency convertor configured to convert the source modulated light into a modulated light having a desirable frequency with use of the reference light. The frequency convertor 10 acts as a difference frequency component generator configured to generate a difference frequency component between the source modulated light and an unmodulated light having a desirable frequency. The frequency convertor 30 acts as a sum frequency component generator configured to generate a sum frequency component of the reference light and the difference frequency component.

Second Embodiment

When a frequency of a modulated light is converted, a spectrum shape may be changed. In a frequency conversion in which the spectrum shape is changed, a signal may be deformed in cases of a phase modulation or a FM modulation. A frequency conversion device is preferable in which the spectrum shape is maintained and a center frequency is relatively moved to a fixed center frequency that is independent of an input frequency.

Figure 4:
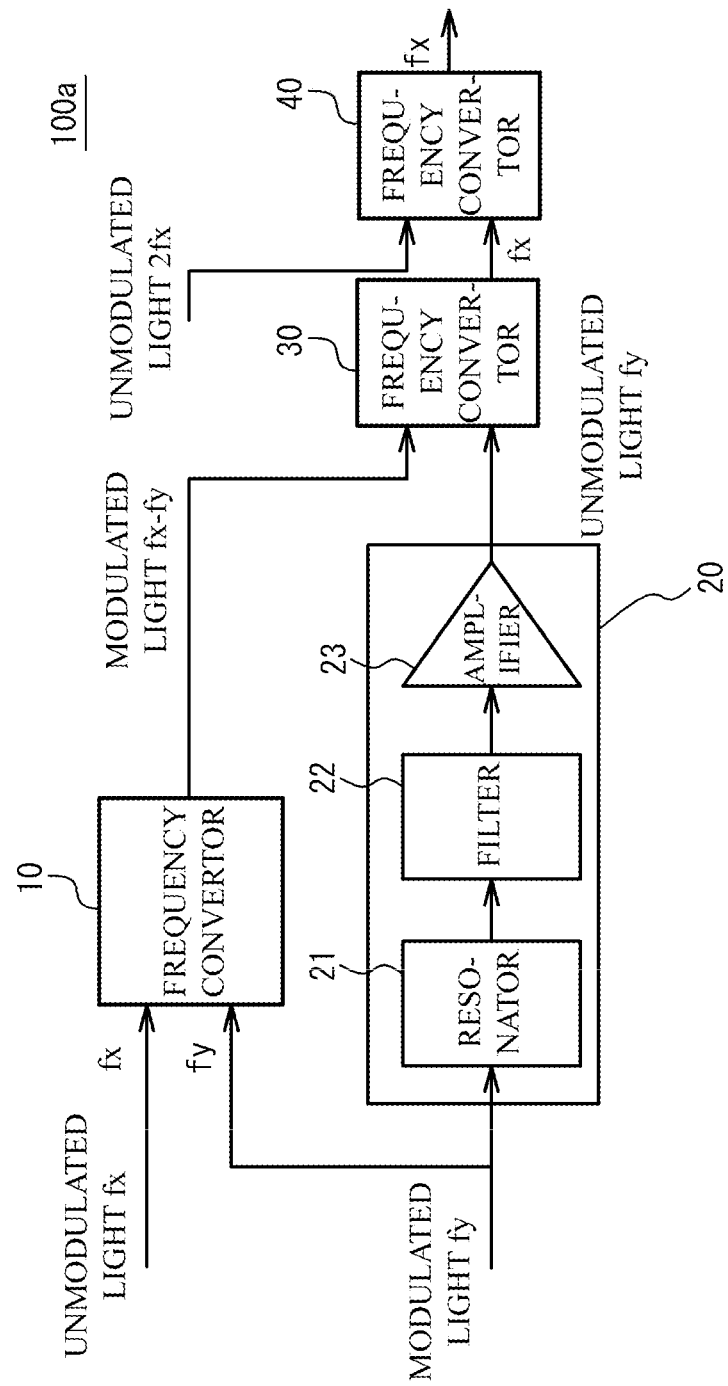
FIG. 4 illustrates a block diagram of a frequency conversion device in accordance with a second embodiment.

FIG. 4 illustrates a block diagram of a frequency conversion device 100a in accordance with a second embodiment. As illustrated in FIG. 4, the frequency conversion device 100a is different from the frequency conversion device 100 in a point that a frequency convertor 40 is further provided. The frequency convertor 40 receives a modulated light fx output by the frequency convertor 30 and an unmodulated light 2fx having a frequency 2×fx. The frequency convertor 40 is non-linear crystal that generates a difference frequency component. The frequency convertor 40 generates a difference frequency component between the unmodulated light 2fx and the modulated light fx. In concrete, the frequency convertor 40 outputs a modulated light fx having a frequency fx.

Figure 5A:
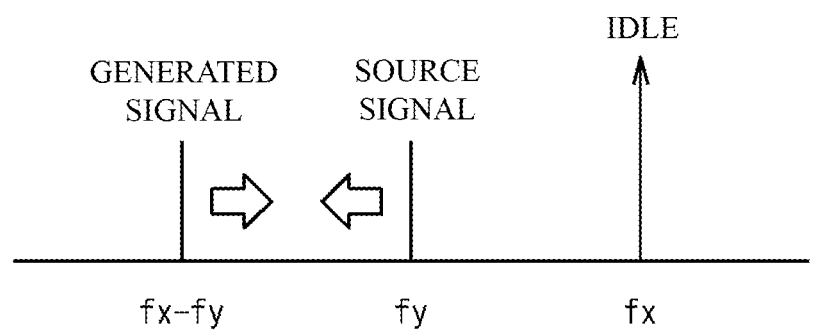
FIG. 5A and FIG. 5B illustrate a frequency conversion in a case where a spectrum shape is unsymmetrical.
Figure 5B:
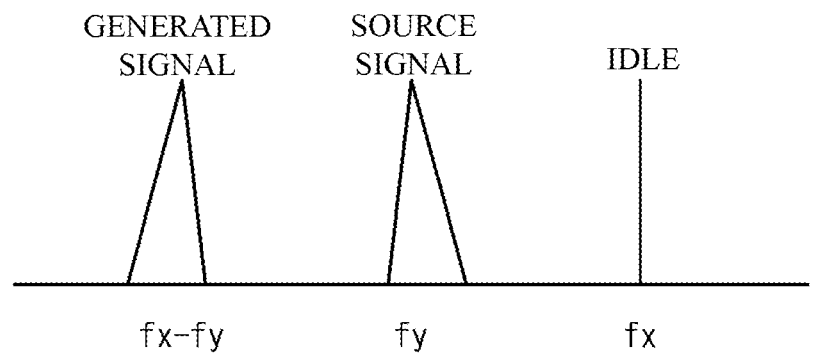

Here, a description will be given of a frequency conversion in which a spectrum shape of the modulated light fy is unsymmetrical with respect to a center frequency. As illustrated in FIG. 5A, when a difference frequency component between the frequency fx and the frequency fy is generated in a case where the frequency fx is larger than the frequency fy, the difference frequency (fx−fy) becomes larger as the frequency fy decreases. Therefore, as illustrated in FIG. 5B, the spectrum shape of the modulated light (fx−fy) that is the difference frequency component between the unmodulated light fx and the modulated light fy is inverted with respect to the spectrum shape of the modulated light fy.

Figure 6A:
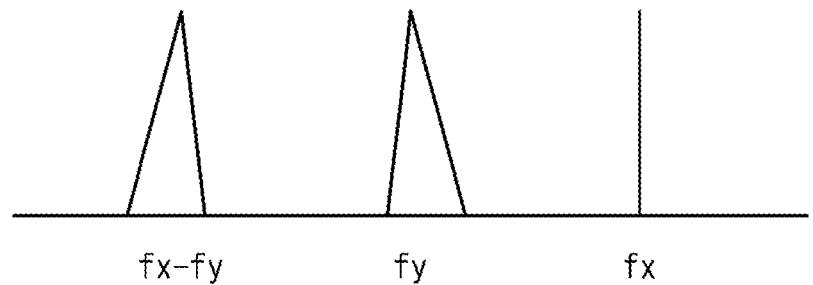
FIG. 6A to FIG. 6C illustrate processes in which a modulated light fx is generated from a modulated light fy and an unmodulated light fx.
Figure 6B:
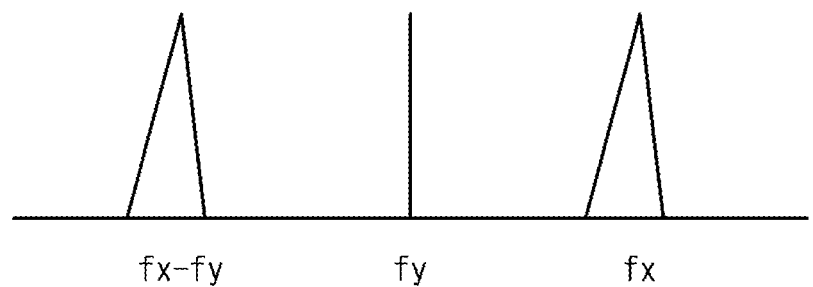
Figure 6C:
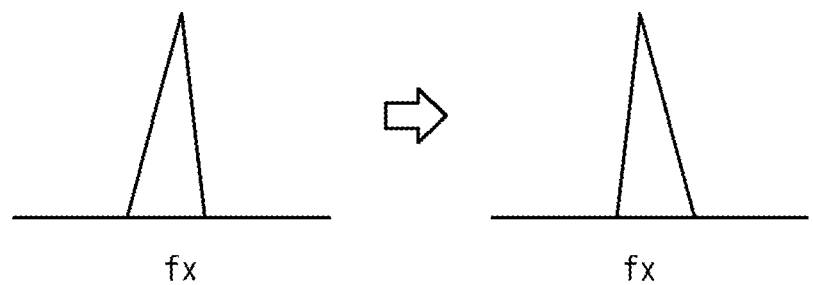

FIG. 6A to FIG. 6C illustrate processes in which the modulated light fx is generated from the modulated light fy and the unmodulated light fx in the embodiment. As illustrated in FIG. 6A, the frequency convertor 10 generates the modulated light (fx−fy) from the modulated light fy and the unmodulated light fx. A spectrum shape of the modulated light (fx−fy) is a shape obtained by inverting a spectrum shape of the modulated light fy. Next, as illustrated in FIG. 6B, the frequency convertor 30 generates the modulated light fx from the modulated light (fx−fy) and the unmodulated light fy. When a sum frequency component of a modulated light and an unmodulated light is generated, a spectrum shape does not change. Further, as illustrated in FIG. 6C, the frequency convertor 40 inverts the spectrum shape of the modulated light fx. With the processes, it is possible to convert the modulated light fy having an arbitrary frequency fy into the modulated light fx having the desirable frequency fx and having the same spectrum shape as the modulated light fy. In the embodiment, the frequency convertor 40 acts as an inverter configured to invert a spectrum.

Third Embodiment

A description will be given of a frequency conversion. A non-linear device for generating a light having a frequency x−y from a light having a frequency x and a light having a frequency y has a regular rule of (x, y)→x−y. When "i" for identifying a modulated light is added to a modulated light, an unmodulated light having a frequency x and a modulated light having a frequency y output a modulated signal having a frequency x−y. Therefore, (x, iy) becomes i(x−y). Similarly, (x, y) becomes x−y, (ix, y) becomes i(x−y) and (ix, iy) becomes x−y. However, these are limited to cases where the lights are identical signals and have a different frequency.

In view of a generation of an integral multiple harmonic frequency, a modulated light having an arbitrary frequency x is converted into a fixed frequency in spite of the frequency x. For example, when a, b, c, d, e and f are positive integers, an integral multiplication and a frequency conversion are performed with respect to a modulated light y and an unmodulated light x that are input. In this case, (ax, iby)→i(ax−by), (cx, idy)→i(cx−dy), and (ex, ify)→i(ex−fy) are achieved.

Moreover, two lights are selected from the generated modulated lights and are amplified. And, the same wavelength (frequency) conversions are performed again. Then, (i(cx−dy), i(ex−fy))→cx−dy−ex+fy=(c−e)x+(−d+f)y is achieved. The same frequency conversions are performed with respect to the unmodulated light and unselected light that is generated above. In this case, (i(ax−by), (c−e)x+(d+f)y)→i(ax−by−(c−e)x+(−d+f)y)=i((a−c+e)x+(−b−d+f)y) is achieved.

When b=d=1, f=2, a=1, c=1 and e=1 are satisfied for example in order to select positive integers allowing f=b+d and a−c+e< >0, (x, iy)→i(x−y), (x, iy)→i(x−y), (x, i2y)→i(x−2y) and (i(x−y), y)→ix are achieved. That is, when the unmodulated light fy generated from the modulated light fy acting as the source modulated light is used as the reference light, it is possible to convert the modulated light fy into the modulated light fx having a desirable frequency with the structures. In the third embodiment, a description will be given of another example of a frequency conversion device.

Figure 7:
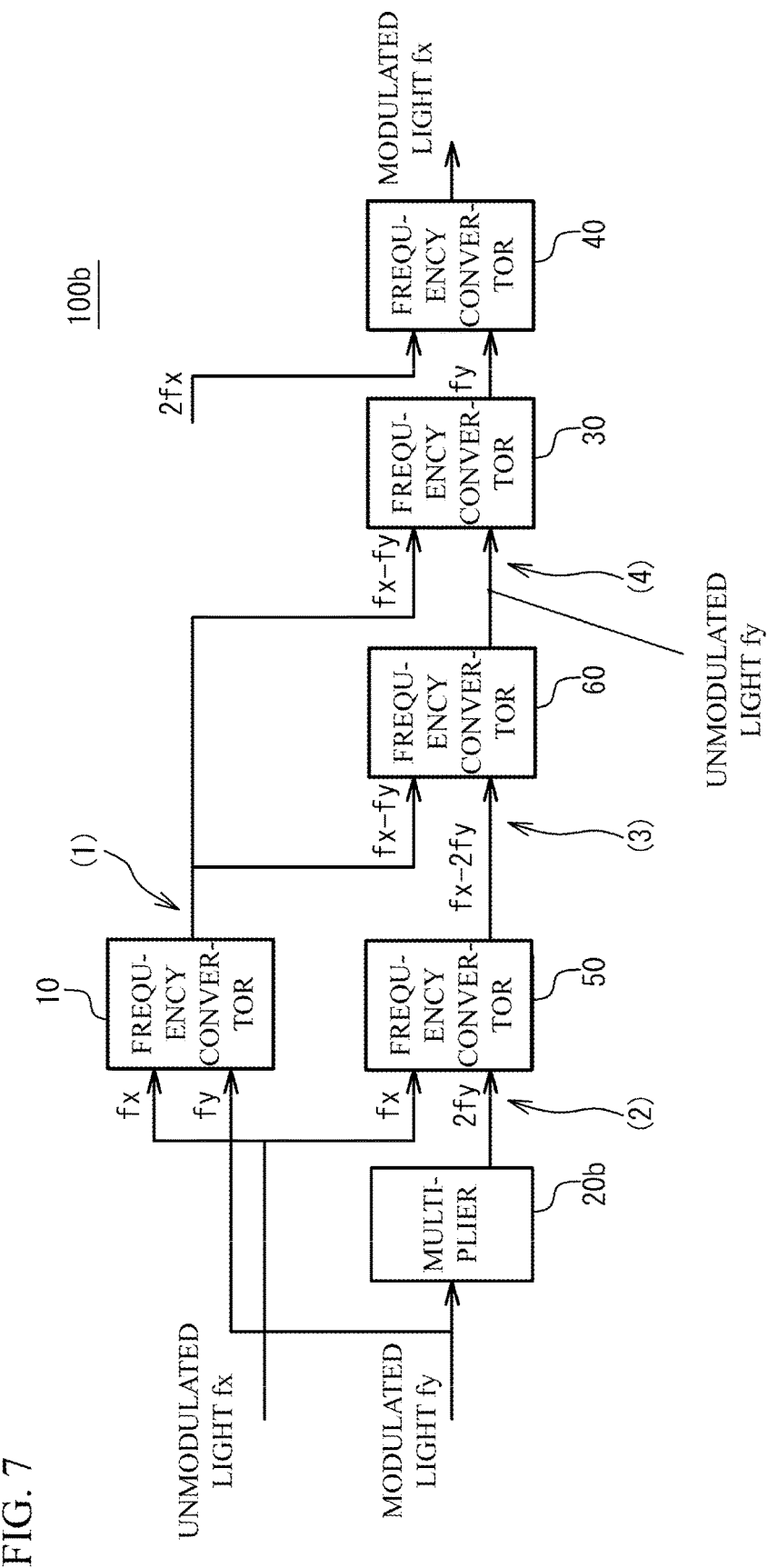
FIG. 7 illustrates a block diagram of a frequency conversion device in accordance with a third embodiment.

FIG. 7 illustrates a block diagram of a frequency conversion device 100b in accordance with the third embodiment. As illustrated in FIG. 7, the frequency conversion device 100b is different from the frequency conversion device 100a of FIG. 4 in points that a multiplier 20b is provided instead of the center frequency extractor 20, and a frequency convertor 50 and a frequency convertor 60 are further provided.

Figure 8A:
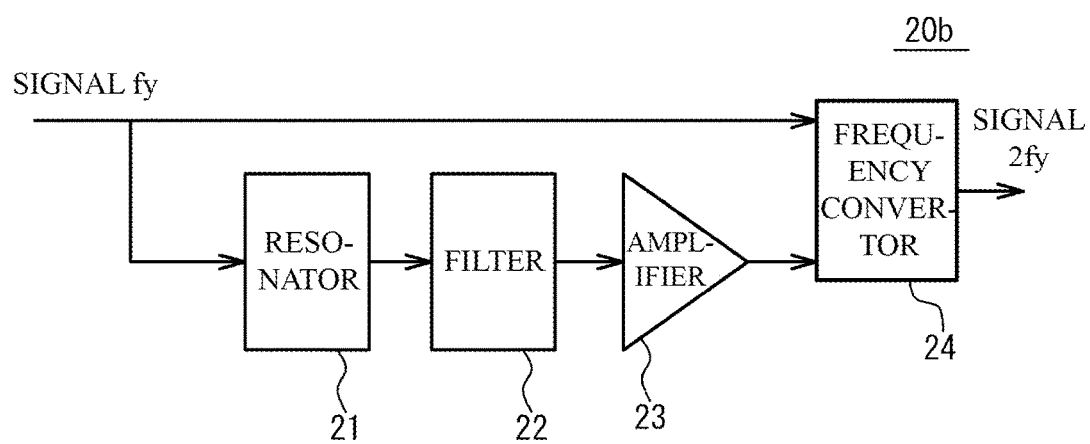
FIG. 8A and FIG. 8B illustrate a multiplier.
Figure 8B:
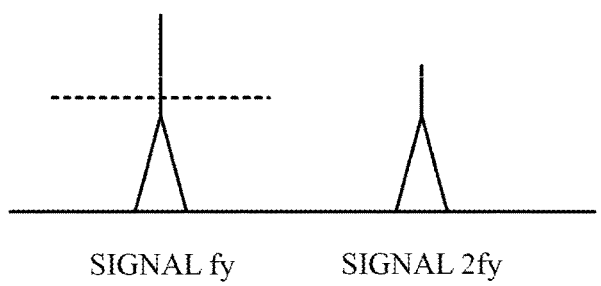

FIG. 8A and FIG. 8B illustrate the multiplier 20b. As illustrated in FIG. 8A, the multiplier 20b has a frequency convertor 24 in addition to the resonator 21, the filter 22 and the amplifier 23. The resonator 21, the filter 22 and the amplifier 23 converts the modulated light fx into the unmodulated light fy by extracting a center frequency of the modulated light fy. The frequency convertor 24 receives the modulated light fy and the unmodulated light fy. The frequency convertor 24 is a non-linear crystal for generating a sum frequency component and generates a modulated light f2y having a frequency 2fy from the modulated light fy and the unmodulated light fy.

When a sum frequency component is simply generated from two modulated lights fy, a spectrum width becomes larger. In contrast, the multiplier 20b generates the unmodulated light fy from the modulated light fy and generates a sum frequency component of the unmodulated light fy and the modulated light fy. In this case, the enlargement of the spectrum width is suppressed. As illustrated in FIG. 8B, when a broadening of the spectrum is positioned above a non-linear threshold, the spectrum width of the modulated light 2f is not enlarged when intensity of a center wavelength is enlarged and a signal intensity is reduced.

As illustrated in FIG. 7 again, the frequency convertor 10 receives the modulated light fy having the frequency fy and the unmodulated light fx having the frequency fx. The frequency convertor 10 outputs the modulated light (fx−fy) having the frequency (fx−fy). The frequency convertor 30 receives the modulated light (fx−fy). The multiplier 20b receives the modulated light fy. The multiplier 20b outputs the modulated light 2fy having the frequency 2×fy.

The frequency convertor 50 receives the unmodulated light fx and the modulated light 2fy. The frequency convertor 50 is a non-linear crystal for generating a difference frequency component. The frequency convertor 50 outputs a modulated light fx−2fy having a frequency fx−2fy (a difference frequency component between the unmodulated light fx and the modulated light 2fy). The frequency convertor 60 receives the modulated light (fx−fy) output by the frequency convertor 10 and the modulated light (fx−2fy) output by the frequency convertor 50. The frequency convertor 60 is a non-linear crystal for generating a difference frequency component. The frequency convertor 60 outputs the modulated light fy (a difference frequency component between the modulated light (fx−fy) and the modulated light (fx−2fy). The unmodulated light fy output by the frequency convertor 60 is input into the frequency convertor 30.

The frequency convertor 30 outputs the modulated light fx having the frequency fx (a sum frequency component of the modulated light (fx−fy) and the unmodulated light fy). The frequency convertor 40 receives the modulated light fx output by the frequency convertor 30 and the unmodulated light 2fx having the frequency 2×fx. The frequency convertor 40 inverts the spectrum shape of the modulated light fx by generating a difference frequency component between the unmodulated light 2fx and the modulated light fx. With the processes, it is possible to convert the modulated light fy having an arbitrary frequency fy into the modulated light fx having a desirable frequency fx and having the same spectrum shape as the modulated light fy.

Figure 9A:
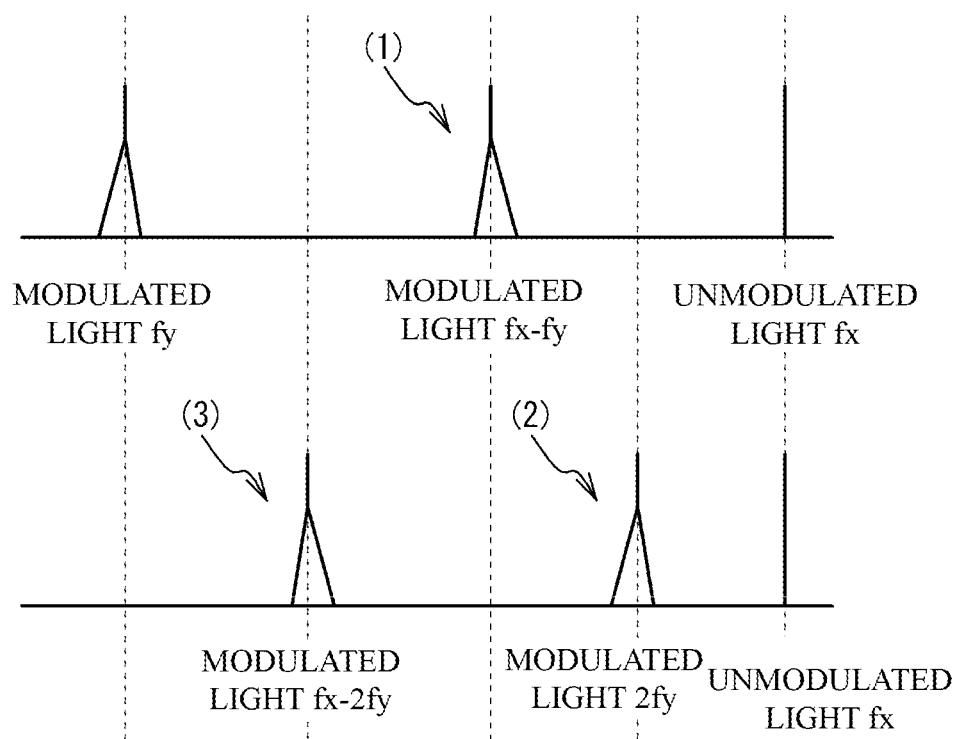
FIG. 9A to FIG. 9C illustrate processes in which a modulated light fx is generated from a modulated light fy and an unmodulated light fx.
Figure 9B:
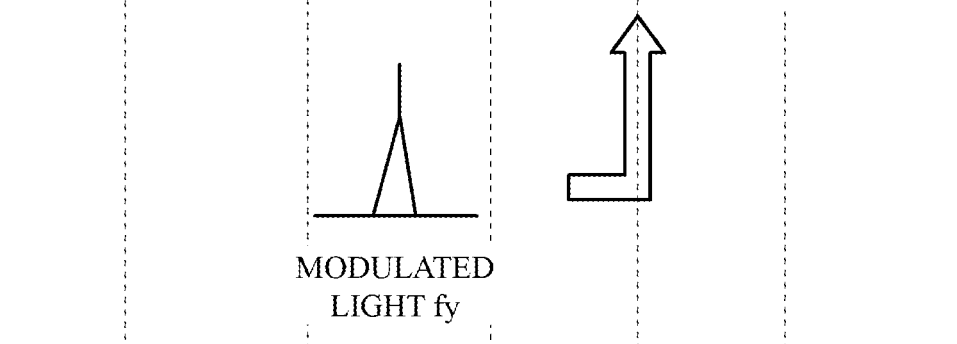
Figure 9C:
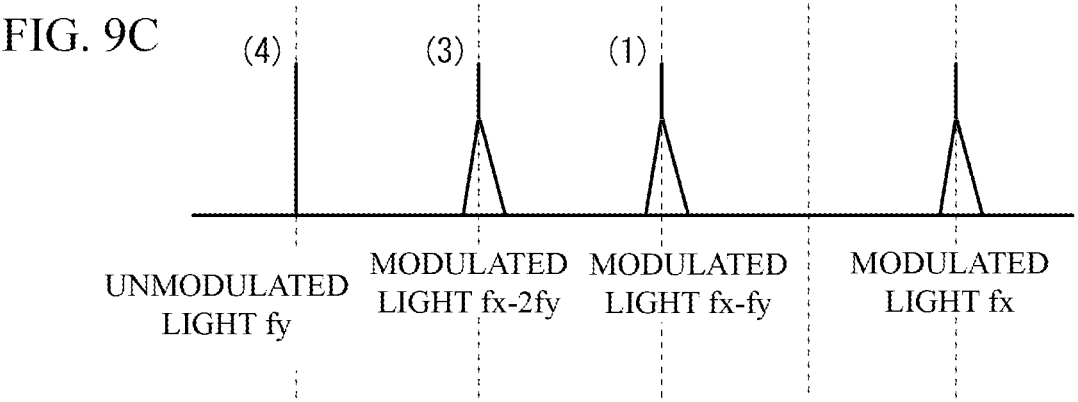

FIG. 9A to FIG. 9C illustrate processes in which the modulated light fx is generated from the modulated light fy and the unmodulated light fx in the embodiment. As illustrated in FIG. 9A, the frequency convertor 10 generates the modulated light (fx−fy) from the modulated light fy and the unmodulated light fx. The spectrum shape of the modulated light (fx−fy) has a shape in which the modulated light fy is inverted. Next, as illustrated in FIG. 9B, the multiplier 20b generates the modulated light 2fy from the modulated light fy. The frequency convertor 50 outputs the modulated light fx−2fy having the frequency fx−2fy. The spectrum shape of the modulated light (fx−fy) is a shape in which the modulated light 2fy is inverted.

Next, as illustrated in FIG. 9C, the modulated light (fx−fy) has the same spectrum shape as the modulated light (fx−2fy). Therefore, the frequency convertor 60 generates the unmodulated light fy from the modulated light (fx−2fy) and the modulated light (fx−fy). Next, the frequency convertor 30 generates the modulated light fx from the unmodulated light fy and the modulated light (fx−fy). When the spectrum shape of the modulated light fx is inverted, the modulated light fy having the same spectrum shape as the modulated light fy is generated.

In the embodiment, the modulated light fy acting as the source modulated light is converted into the unmodulated light fy, and the unmodulated light fy is used as the reference light. And, the modulated light fy can be converted into the modulated light fx having a desirable frequency. When the spectrum shape of the modulated light fx is inverted, the modulated light fy having an arbitrary frequency fy can be converted into the modulated light fx having a desirable frequency fx and having the same spectrum shape as the modulated light fy. In the embodiment, the multiplier 20b, the frequency convertor 50 and the frequency convertor 60 act as an optical convertor that converts a source modulated light into a reference light.

Fourth Embodiment

Figure 10:
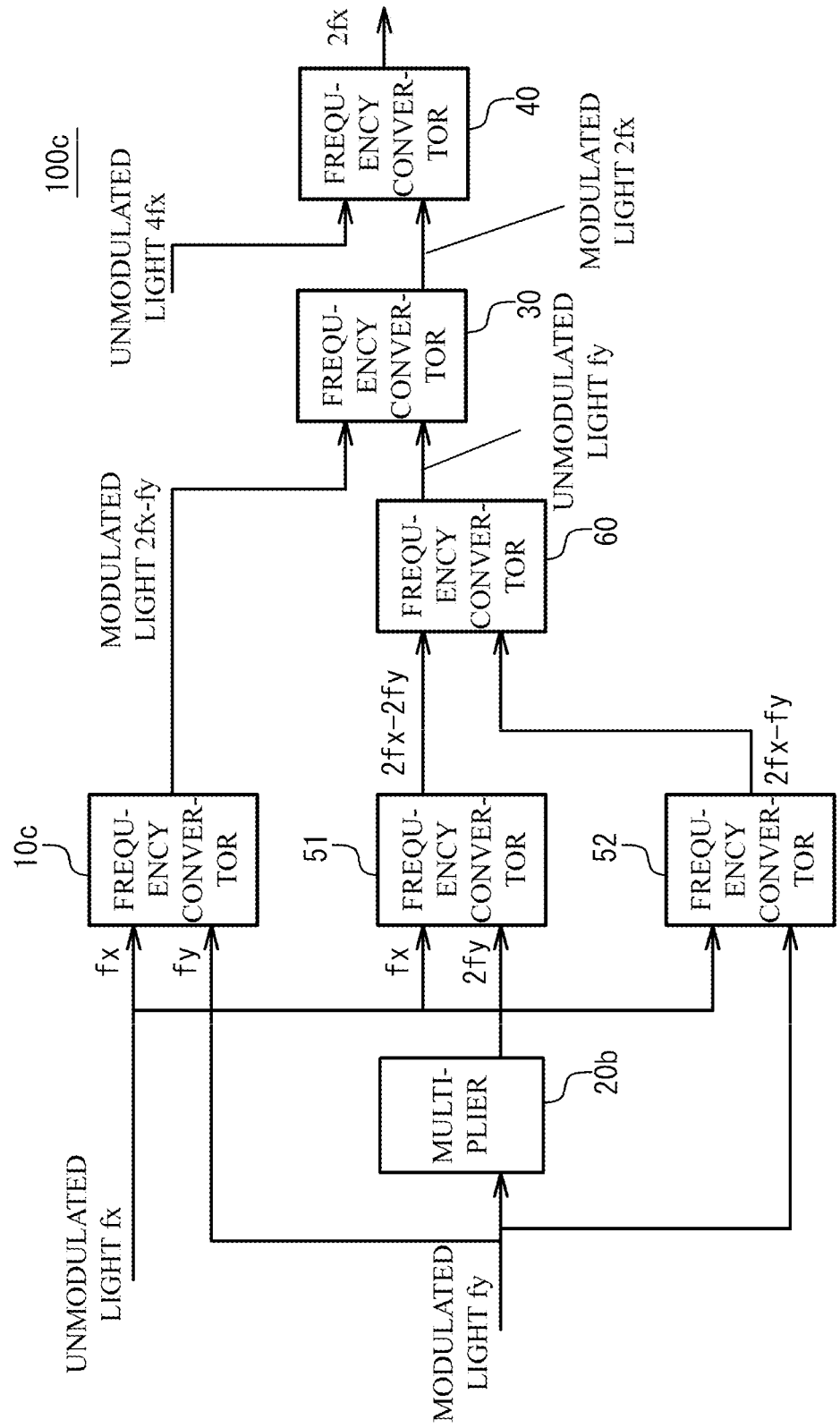
FIG. 10 illustrates a block diagram of a frequency conversion device in accordance with a fourth embodiment.

FIG. 10 illustrates a block diagram of a frequency conversion device 100c in accordance with a fourth embodiment. As illustrated in FIG. 10, the frequency conversion device 100c is different from the frequency conversion device 100b in points that a frequency convertor 10c is provided instead of the frequency convertor 10, and a frequency convertor 51 and a frequency convertor 52 are provided instead of the frequency convertor 50. The frequency convertor 10c and the frequency convertors 51 and 52 are non-linear crystals that generate a frequency component of 2x−y by symmetrically moving the frequency fy with respect to the frequency fx.

The frequency convertor 10c receives the modulated light fy having the frequency fy and the unmodulated light fx having the frequency fx. The frequency convertor 10c outputs a modulated light (2fx−fy) having a frequency (2fx−fy). The frequency convertor 30 receives the modulated light (2fx−fy). The multiplier 20b receives the modulated light fy. The multiplier 20b outputs the modulated light 2fy having the frequency 2×fy.

The frequency convertor 51 receives the unmodulated light fx and the modulated light 2fy. The frequency convertor 51 outputs a modulated light (2fx−2fy) having a frequency 2fx−2fy. The frequency convertor 52 receives the unmodulated light fx and the modulated light fy. The frequency convertor 52 outputs a modulated light (2fx−fy) having a frequency 2fx−fy. The frequency convertor 60 generates the unmodulated light fy from the modulated light (2fx−2fy) and the modulated light (2fx−fy), because the modulated light (2fx−2fy) has the same spectrum shape as the modulated light (2fx−fy).

The frequency convertor 30 outputs the modulated light 2fx having the frequency 2fx (a sum frequency component of the modulated light (2fx−fy) and the unmodulated light fy). The frequency convertor 40 receives the modulated light 2fx output by the frequency convertor 30 and an unmodulated light 4fx having a frequency 4×fx. The frequency convertor 40 inverts the spectrum shape of the modulated light 2fx by generating a difference frequency component between the unmodulated light 4fx and the modulated light 2fx. When the difference frequency component between the modulated light 2fx and the unmodulated light fx is generated, it is possible to generate the modulated light fx having a desirable frequency fx and having the same spectrum shape as the modulated light fy.

In the embodiment, the modulated light fy acting as a source modulated light is converted into the unmodulated light fy, and the unmodulated light fy is used as the reference light. And the modulated light fy can be converted into the modulated light fx having a desirable frequency. When the spectrum shape of the modulated light fx is inverted, it is possible to convert the modulated light fy having an arbitrary frequency fy into the modulated light fx having a desirable frequency fx and having the same spectrum shape as the modulated light fy. In the embodiment, the multiplier 20b, the frequency convertors 51 and 52 and the frequency convertor 60 act as an optical convertor that converts a source modulated light into a reference light.

[Another Example for Converting the Modulated Light Fy into the Unmodulated Light Fy]

There is a case where the input modulated light fy has a spectrum shape that does not have a maximum peak at a center frequency (for example, a double peaks shape). In this case, it is difficult to generate an unmodulated light having a center frequency of the modulated light fy. And so, a description will be given of another example where the modulated light fy is converted into the unmodulated light fy when the modulated light fy does not have a maximum peak at a center frequency.

When frequencies of channels have an identical interval of $\Delta$ Hz, an n-th frequency can be expressed by $fn = fa + nX\Delta$ with use of a reference frequency fa. Therefore, when "n" is determined, an object frequency is also determined. When an order of a frequency of the received modulated light is monitored, it is possible to select and output an unmodulated light having an object frequency from a multiple wavelength idle light source prepared in advance.

Figure 11:
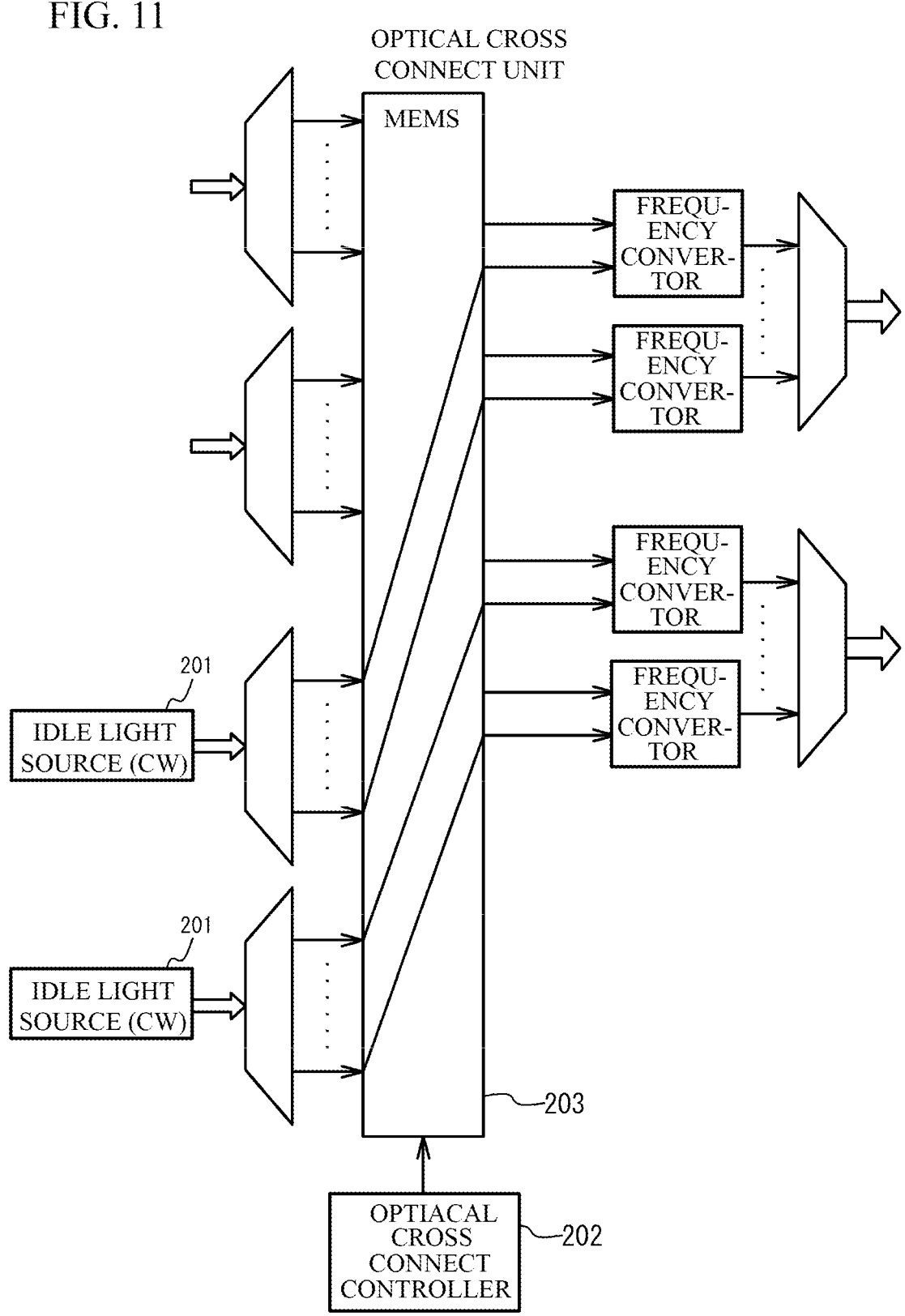
FIG. 11 illustrates an example in which an unmodulated light having a desirable frequency is selected.

FIG. 11 illustrates an example of a structure for selecting an unmodulated light having a desirable frequency. As illustrated in FIG. 11, a multiple wavelength idle light source 201 outputs unmodulated lights having a different frequency. An optical cross connect controller 202 makes the multiple wavelength idle light source 201 output an unmodulated light having a desirable frequency by controlling a cross connect unit 203 such as a MEMS. It is possible to use the unmodulated light as an unmodulated light having a center frequency of the modulated light fy.

Figure 12:
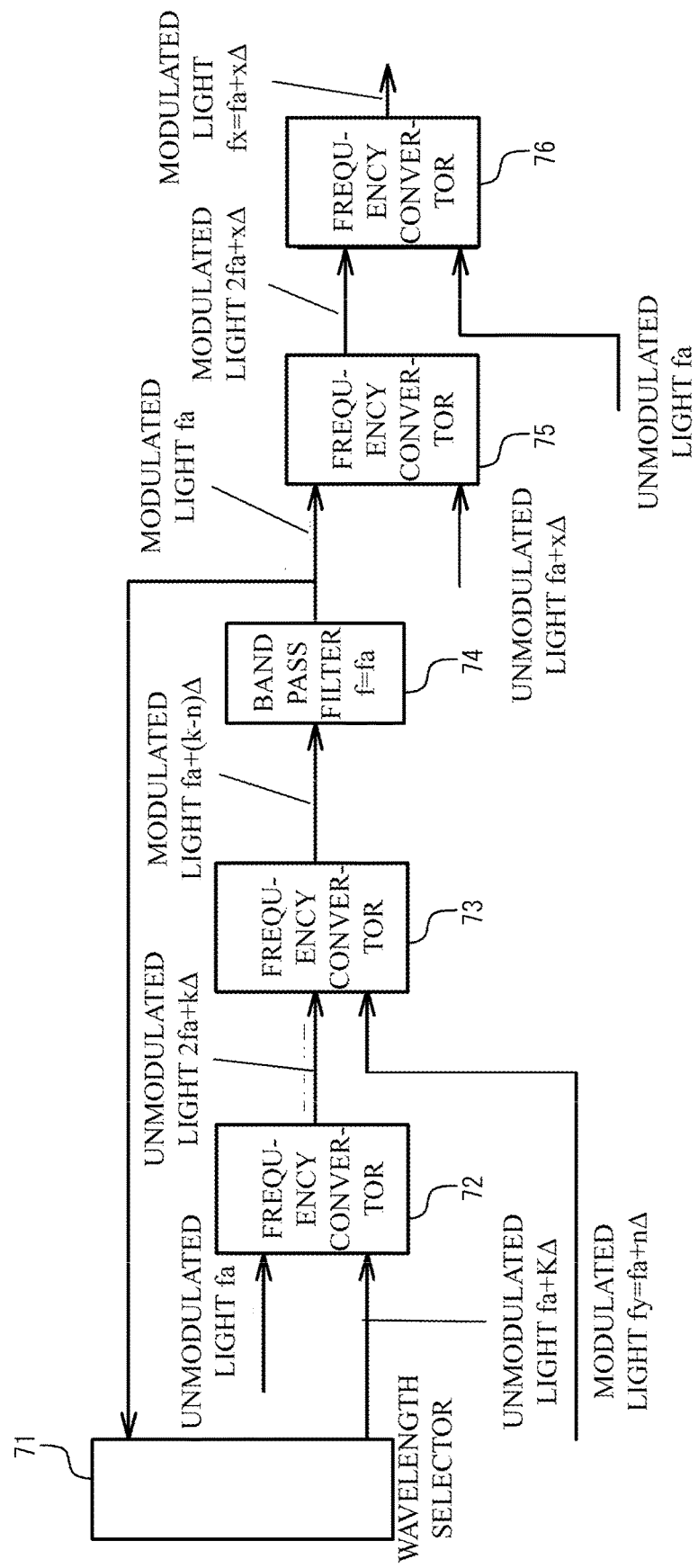
FIG. 12 illustrates another example in which an unmodulated light having a desirable frequency is selected.

FIG. 12 illustrates another example of the structure for selecting an unmodulated light having a desirable frequency. As illustrated in FIG. 12, a wavelength selector 71 outputs an unmodulated light fa+k$\Delta$ having a frequency fa+k$\Delta$. "k" is an integer from zero to n. A frequency convertor 72 outputs an unmodulated light 2fa+k$\Delta$ that is a sum frequency component of the unmodulated light fa having the frequency fa and the unmodulated light fa+k$\Delta$. A frequency convertor 73 outputs a modulated light fa+(k−n)$\Delta$ that is a sum frequency component of the modulated light fy having an n-th frequency fy (=fa+n$\Delta$) and the unmodulated light 2fa+k$\Delta$.

A band pass filter 74 is a filter that selectively transmits only a light having the frequency fa. Therefore, only when k=n, the modulated light fa+(k−n)$\Delta$ is transmitted. The wavelength selector 71 changes the "k" until the band pass filter 74 outputs the modulated light fa. When the band pass filter 74 outputs the modulated light fa, a frequency convertor 75 outputs a modulated light 2fa+xΔ that is a sum frequency component of the unmodulated light fx(=fa+xΔ) and the modulated light fa. A frequency convertor 76 outputs a modulated light fa+xΔ that is a difference frequency component between the modulated light 2fa+kΔ and the unmodulated light fa. With the structure, it is possible to convert the modulated light fy having an arbitrary frequency fy into the modulated light fx having a desirable frequency fx and having the same spectrum shape as the modulated light fy. In the embodiment, the unmodulated light fa+kΔ that is output from the wavelength selector 71 when k=n corresponds to the unmodulated light fy of the modulated light fy.

[Structure Example to which the Frequency Conversion Devices are Applied]

Figure 13:
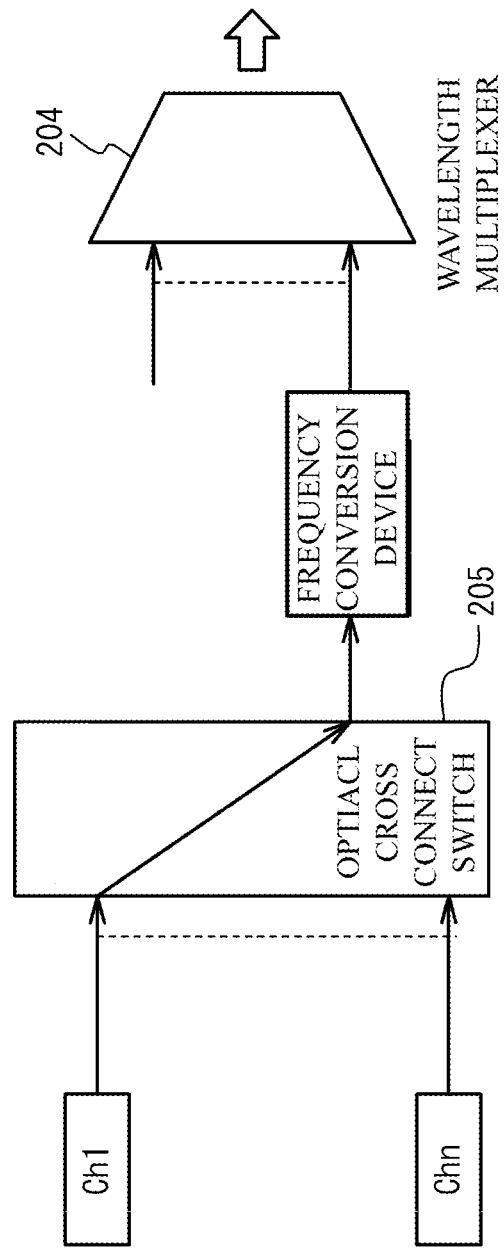
FIG. 13 illustrates a structure example to which a frequency conversion device is applied.

As illustrated in FIG. 13, a wavelength multiplexer 204 that multiplexes a plurality of wavelength lights has channel ports. Each of the above-mentioned frequency conversion devices corresponding to each channel port is connected to the port. With the structure, it is possible to transfer an arbitrary frequency (wavelength) received from upstream to any port. When an optical switch 205 optically cross-connects each frequency to an empty port where no modulated light is transmitted, each frequency can be converted into an adequate empty frequency without problem. During a normal WDM multiplexing, it is necessary to adjust a power level of each channel. A variable attenuator is not necessary because an output power can be adjusted by adjusting a wavelength (frequency) conversion efficiency in each frequency convertor.

Figure 14A:
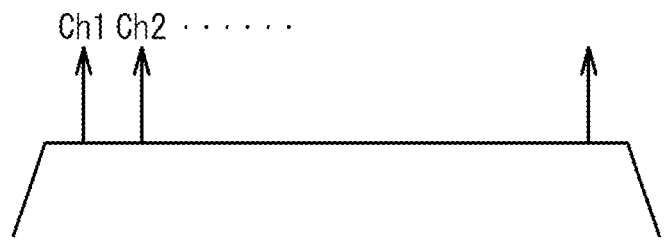
FIG. 14A to FIG. 14C illustrate setting examples of each channel.
Figure 14B:
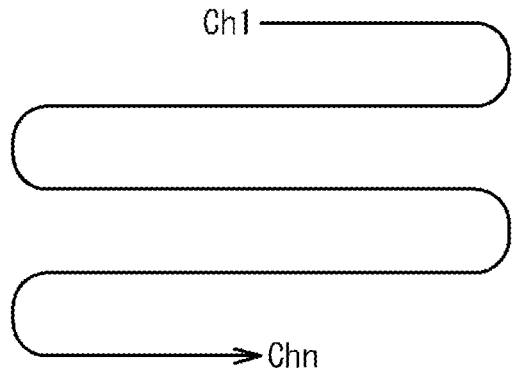
Figure 14C:
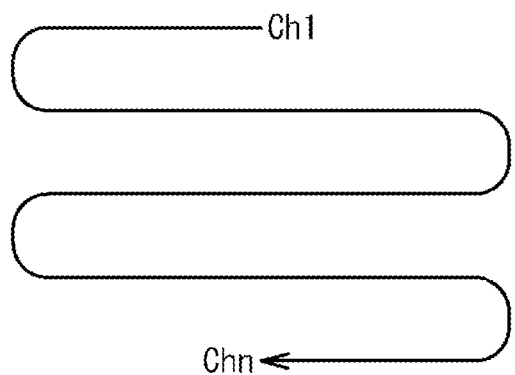

FIG. 14A to FIG. 14C illustrate setting examples of each channel. As illustrated in FIG. 14A, the channels may be set in order from a lower wavelength to a higher wavelength. As illustrated in FIG. 14B and FIG. 14C, each channel may be set by connecting the optical cross connect to an empty wavelength from near the center of the wavelength range.

Another Example

In the above-mentioned embodiments, a non-linear crystal is used as the frequency convertors. However, another frequency convertor may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A frequency conversion device comprising:
    an optical convertor configured to convert a source modulated light into an unmodulated light by resonating the source modulated light and extracting a center frequency of the source modulated light during the resonating; and
    a frequency convertor configured to use the unmodulated light converted by the optical convertor as a reference light and convert the source modulated light into a modulated light that has a desirable frequency.

2. The frequency conversion device as claimed in claim 1, wherein the frequency convertor comprises:
    a difference frequency component generator configured to generate a difference frequency component between the source modulated light and the unmodulated light that has the desirable frequency; and
    a sum frequency component generator configured to generate a sum frequency component of the reference light and the difference frequency component.

3. The frequency conversion device as claimed in claim 2 further comprising:
    an inverter configured to invert a spectrum of the sum frequency component.

4. The frequency conversion device as claimed in claim 1, wherein the optical convertor converts the source modulated light into the unmodulated light by selectively transmitting a center frequency of the source modulated light.

5. The frequency conversion device as claimed in claim 1, wherein the optical convertor detects a frequency of the source modulated light, selects an unmodulated light that has a detected frequency and outputs the selected unmodulated light.

6. A wavelength multiplex device comprising:
    a multiplexer that multiplexes a plurality of wavelength lights;
    a plurality of frequency conversion devices that are respectively coupled with each inputting port of the multiplexer, the plurality of frequency conversion devices comprising an optical convertor configured to convert a source modulated light into an unmodulated light by resonating the source modulated light and extracting a center frequency of the source modulated light during the resonating and a frequency convertor configured to use the unmodulated light converted by the optical convertor as a reference light and convert the source modulated light into a modulated light that has a desirable frequency; and
    an optical switch that inputs an arbitrary wavelength light into one of the plurality of frequency conversion devices.

7. The wavelength multiplex device as claimed in claim 6, wherein the frequency convertor comprises:
    a difference frequency component generator configured to generate a difference frequency component between the source modulated light and the unmodulated light that has the desirable frequency; and
    a sum frequency component generator configured to generate a sum frequency component of the reference light and the difference frequency component.

8. The wavelength multiplex device as claimed in claim 7, wherein the plurality of frequency conversion devices further comprise an inverter configured to invert a spectrum of the sum frequency component.

9. The wavelength multiplex device as claimed in claim 6, wherein the optical convertor converts the source modulated light into the unmodulated light by selectively transmitting a center frequency of the source modulated light.

10. The wavelength multiplex device as claimed in claim 6, wherein the optical convertor detects a frequency of the source modulated light, selects an unmodulated light that has a detected frequency and outputs the selected unmodulated light.

11. A frequency conversion method comprising:
    converting a source modulated light into an unmodulated light, with an optical convertor, by resonating the source modulated light and extracting a center frequency of the source modulated light during the resonating; and using the unmodulated light as a reference light and converting the source modulated light into a modulated light having a desirable frequency, with a frequency convertor.

12. The method as claimed in claim 11, wherein the converting the source modulated light into the modulated light comprises:

generating a difference frequency component between the source modulated light and the unmodulated light that has the desirable frequency, with a difference frequency component generator; and generating a sum frequency component of the reference light and the difference frequency component, with a sum frequency component generator.

13. The method as claimed in claim 12 further comprising:

inverting a spectrum of the sum frequency component, with an inverter.

14. The method as claimed in claim 11, wherein the converting the source modulated light into the unmodulated light includes converting the source modulated light into the unmodulated light by selectively transmitting a center frequency of the source modulated light.

15. The method as claimed in claim 11, wherein the converting the source modulated light into the unmodulated light includes detecting a frequency of the source modulated light, selecting an unmodulated light that has a detected frequency and outputting the selected unmodulated light.

* * * * *